United States Patent
Schmidt

(10) Patent No.: US 9,395,812 B2
(45) Date of Patent: Jul. 19, 2016

(54) METHOD AND SYSTEM FOR PRESENTING AT LEAST ONE IMAGE OF AT LEAST ONE APPLICATION ON A DISPLAY DEVICE

(71) Applicant: Eberhard Schmidt, Kleinmachnow (DE)

(72) Inventor: Eberhard Schmidt, Kleinmachnow (DE)

(73) Assignee: SENSOMOTORIC INSTRUMENTS GESELLSCHAFT FUR INNOVATIVE SENSORIK MBH, Teltow (DE)

( * ) Notice: Subject to any disclaimer, the term of this patent is extended or adjusted under 35 U.S.C. 154(b) by 39 days.

(21) Appl. No.: 14/367,401

(22) PCT Filed: Dec. 21, 2012

(86) PCT No.: PCT/EP2012/076730
§ 371 (c)(1),
(2) Date: Jun. 20, 2014

(87) PCT Pub. No.: WO2013/093040
PCT Pub. Date: Jun. 27, 2013

(65) Prior Publication Data
US 2014/0375554 A1    Dec. 25, 2014

(30) Foreign Application Priority Data

Dec. 23, 2011    (EP) .................................... 11195681

(51) Int. Cl.
*G09G 5/373*    (2006.01)
*G06F 3/01*    (2006.01)

(52) U.S. Cl.
CPC ...................................... *G06F 3/011* (2013.01)

(58) Field of Classification Search
CPC .............. G09G 2330/021; G09G 2320/0285; G09G 2360/18; G09G 3/3233; G09G 2300/0842; G09G 2320/029; G09G 2320/0295; G09G 2320/043; G09G 2330/02; G09G 2330/026; G09G 2330/027; G09G 2352/00; G09G 2360/00; G06F 3/016; G06F 3/041; G06F 1/1652; G06F 3/013
USPC .................................. 345/156, 169, 173–175
See application file for complete search history.

(56) References Cited

U.S. PATENT DOCUMENTS 8,368,723 B1 *   2/2013 Gossweiler et al. .......... 345/660
2001/0024213 A1   9/2001 Doi et al.
(Continued)

FOREIGN PATENT DOCUMENTS

WO    2007/089198 A1    8/2007

OTHER PUBLICATIONS

English translation of the international preliminary report on patentability, corresponding with International Application No. PCT/EP2012/076730 filed Dec. 21, 2012.

*Primary Examiner* — Duc Dinh
(74) *Attorney, Agent, or Firm* — Sughrue Mion, PLLC

(57) ABSTRACT

The present invention comprises a method for presenting at least one image of at least one application on a display device, comprising the following steps: a) (140) provision of at least one first image of the application to a processing device; b) capture of at least one second image of at least one body part of at least one user (22) using at least one capturing device (20); c) coupling of the at least one second image to the processing device; d) presentation of the at least one first image provided in step a) (140) on the display device, wherein the presentation in step d) uses at least one presentation parameter, the at least one value of the at least one presentation parameter depending on at least one position value correlated with the position of the at least one body part in the at least one second image captured in step b) (110). The invention further relates to a corresponding system for presenting at least one image of an application.

15 Claims, 4 Drawing Sheets

(56) References Cited

U.S. PATENT DOCUMENTS

Figure 1:
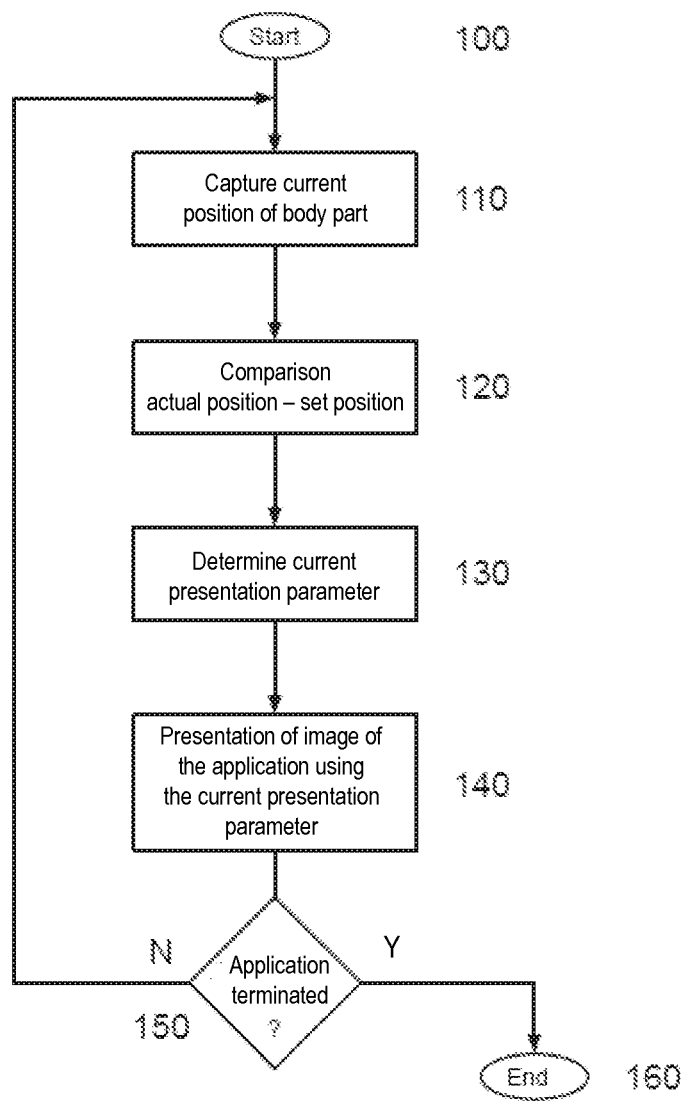

| | | |
|---|---|---|
| 2010/0205667 A1 | 8/2010 | Anderson et al. |
| 2010/0277411 A1* | 11/2010 | Yee et al. .................. 345/156 |
| 2010/0281437 A1 | 11/2010 | Stone-Perez et al. |
| 2011/0080489 A1 | 4/2011 | Chen et al. |

* cited by examiner

METHOD AND SYSTEM FOR PRESENTING AT LEAST ONE IMAGE OF AT LEAST ONE APPLICATION ON A DISPLAY DEVICE

The present invention relates to a method for presenting at least one image of at least one application on a display device including the following steps of: a) providing at least one first image of the application to a processing device; b) capturing at least one second image of at least one body part of at least one user with at least one capturing device; c) coupling the at least one second image to the processing device; d) presenting the at least one first image provided in step a) on the display device.

Moreover, the invention relates to a system for presenting at least one image of an application including a processing device, a providing device adapted to provide at least one first image of the application to the processing device, wherein the providing device is coupled to the processing device, a capturing device coupled to the processing device, wherein the capturing device is adapted to continuously capture second images of at least one body part of a user; as well as a display device coupled to the processing device for presenting the at least one first image.

From the prior art, applications are known, in particular on PCs, cellular phones, tablet computers and the like, the proper execution of which depends on a user being positioned within presettable boundaries of a set positional range in front of a capturing device, in particular a 2D or 3D camera. For this purpose, for example, second images can be presented on the display device in real time independently of the first image of the application, which the capturing device continuously captures of a body part of the user, for example the head thereof. By control of his position, thereby, the user is enabled to bring himself into a position optimum for the execution of the application. In this context, so-called tracking systems are known, which for example serve for tracking the temporal progression of the direction of view of the user during the execution of the application. It is problematic in this approach that the user, even if he only focuses on the application, has to conceive in the viewing angle and on an own presentation if he is already or still in the optimum position for performing the application. If the view of the user divagates from the image captured by the capturing device, the recorded measured values are unusable. In addition, the flow of the interaction between user and application is disturbed. Alternatively, the position of the user can be controlled by a second person, who then gives instructions to the first person such that he can optimize his position. However, due to these acoustic instructions, the optimum performance of the application is impaired since the user is distracted.

In context with the field of the present invention, a foil of the company 3M known from the prior art under the designation Security Shade is known, which can be applied to a monitor and only allows recognition of the image presented on the monitor if the user is in a set position in front of the monitor, in particular within a presettable angle. Furthermore, the use of webcams or kinect cameras for generating interactive presentations with 3D effect on a monitor is known. While the Security Shade foils are intended for the protection from unwanted co-readers and accordingly restricts the angle of view, from which the monitor content can be recognized, there is a disadvantage in that it reduces emitted light and thereby intensity and contrast of the presentation on the monitor for each angle of view even in the optimum position of the user. Moreover, it is rigid and cannot be adapted to the working situation or the application.

From US 2011/0080489 A1, it is known to provide a feedback in discrete form to the user, for example as a flashing warning lamp, in response to predetermined relations of the image of for example the head of the user to a camera. This discrete form of the positional feedback can be usable for some applications. However, the attention of the user with respect to the actual application is in turn reduced by the warning lamp. Moreover, after flashing of the warning lamp, the user does not know, in which direction he is to correct his position such that diverse failed attempts can precede to again taking up the optimum position, which may impair the application and result in time loss.

US 2010/0205667 A1 teaches an access securing solution recognizing the face of a specific user in front of the monitor based on a camera image and thereupon visualizing or not the respective presentations on the monitor among other things.

WO 2007/089198 A1 teaches the utilization of the presentation of a body part in the camera image as a relative feedback for the presentation on the monitor. In this context, a change of the presentation on the monitor is always understood as a specific interaction of the user with the presentation content on the monitor and supports it.

Therefore, the object of the present invention is to develop a generic method and a generic system, respectively, such that improvement of the execution of applications, in which it is essential that a user takes up a set position in front of the capturing device within presettable boundaries, is allowed.

This object is solved by a method having the features of claim 1 as well as by a system having the features of claim 14.

The present invention is based on the realization that this object can be basically solved if the presentation of the application on the display device is modified depending on the images of at least one body part of the user captured by the capturing device, in particular in real time. Therefore, a method according to the invention is characterized in that the presentation in step d) is effected using at least one presentation parameter, wherein the at least one value of the at least one presentation parameter depends on at least one positional value correlated with the position of the at least one body part in the at least one second image captured in step b). By the term capturing device, according to the invention, in particular 2D cameras, 3D cameras, infrared cameras, movement sensors, thermal sensors, ultrasonic sensors and the like are to be understood. This modification of the image of the application achievable thereby is in particular to be effected if the at least one body part, for example the head of the user, captured by the capturing device, gets to the border of the capturing range of the capturing device. Accordingly, according to the invention, by the term second image, in particular also the output signals of an ultrasonic sensor or a light barrier are to be understood.

Within the scope of the present invention, by a positional value, all parameters are to be understood, which are correlated with the position, thus in particular the actual location of the body part, the speed, with which the body part is moved, or the acceleration, with which the body part is accelerated. Furthermore, combinations of these parameters are included, for example if the body part is moved at a presettable location with a certain speed.

By the present invention, it can be achieved that the user obtains the impression that he cannot correctly see the image of the application presented on the display device if he is not in a presettable position in front of the capturing device. This means, the content presented on the display device degrades in its visibility to the user if he moves close to the border of the optimum positional range, and inversely improves if he moves away from this border towards the optimum positional range. By this approach, the attention of the user can stay with the application, since the recorded body part is not presented on the display device. By this approach, the user implicitly obtains information to his position such that a smooth feedback solution suitable for daily use is provided. Thus, the content of the display device relevant to the application is modified and additional measure distracting the attention of the user is not required.

Alternatively to the implicit visual feedback, as the present invention teaches it, one could also imagine other feedbacks to the user. Therein, in particular such are considered, which address individual or multiple senses of the user in other manner. Therefore, tactile, auditory or olfactory as well as temperature feedback could exist. Due to the good controllability of the impression at the user, tactile and auditory feedback primarily seems to be suitable among these different methods. The suitability of these two is to be shortly elaborated on here:

Auditory feedback: a warning tone, which is for example interrupted or continuous and for example changes its volume, pitch or its rhythm, could act like an "acoustic cage" for the user, in which the user is to keep the relevant body part. Certainly, this method also achieves the desired effect, but has the disadvantage that first a further actuator (loudspeaker) has to be present and operated, secondly, that noises arise for the feedback, which can in turn be disturbing to the environment, other users, the application itself, and thirdly, the feedback is effected on another sensory channel than that, which should be actually optimum—namely the visual one, since it is a visual interaction with an application—whereby a detour arises for the user as well as a delay and/or additional burden resulting from it.

Tactile feedback: for a reasonable tactile feedback, the transmission of force to the user in a comprehensible form would be required. As such, this is already difficult and moreover requires corresponding actuators such as for example fans, tactile switches or the like. The disadvantages of the acoustic feedback would similarly occur even if noises inherently could be better avoided.

In a preferred embodiment, the at least one presentation parameter adopts at least one value from a first range of values for at least one first presettable pixel of the first image and at least one value from a second range of values for at least one second presettable pixel of the first image, if the at least one positional value is in a first range, wherein the second range of values is different from the first range of values. This approach allows a user to implicitly recognize in particularly simple manner whether or not he is within a set range. For example, by this embodiment, it is allowed to select the presentation parameter for an image area, for example for the center, such that this image area is virtually presented in unmodified manner. Outside of this central area, the image can be presented in modified manner, for example shadowed or blurred. The boundary from the first to the second image area can be varied by modification of the corresponding presentation parameter associated with the respective pixels depending on the position of the user—recognizable on the mentioned body part—in order to give a feedback to the person about his position. The greater the non-shadowed or sharply depicted area, the closer this person is to a presettable set range.

A characteristic of the above described embodiment can be in a binary solution, in which for example the at least one presentation parameter adopts a first value for at least one first presettable pixel and adopts a second value for at least one second presettable pixel, which is different from the first value, if the at least one positional value is in a first range. For example, it is encompassed by this variant that the application is presented blurred or black on the display device as long as the body part of the user is outside of the set range, while the second application is presented clearly, brightly and sharply on the display device if the body part of the user is in the set position.

In a further preferred embodiment, it can be provided that for the presentation in step d) for at least one first presettable pixel a first presentation parameter and for at least one second presettable pixel a second presentation parameter differing from the first presentation parameter are modified depending on the positional value in presettable manner. This includes that for example if the user is not in the optimum position in front of the capturing device, the magnification factor is modified in a central area and the brightness factor is modified in an area surrounding this central area. Insofar, via two or more modifications of the image presented on the display device, the user can obtain a particularly clear indication to his current position easily to be captured and correspondingly correct it.

As already mentioned, the first range in particular constitutes a range outside of a set range. Therein, it can also be a single set value. However, it is more practicable if the set range presents a presettable range, in which acceptable deviations of the positional value are taken into account. If the body part of the user is in the presettable set range, i.e. the user for example sits in optimum manner to the capturing device, modifications of the image presented on the display device are not required. Insofar, modifications are only required depending on the positional value if the body part of the user is not in the presettable set range.

A particularly advantageous embodiment is characterized in that the at least one value of the respective presentation parameter is varied in presettable manner depending on the deviation of a position of the body part from a presettable positional range, in particular a set positional range and/or depending on the deviation of a speed, that is positional variation, of the body part from a presettable speed range, in particular set speed range, or depending on the deviation of an acceleration, that is positional speed variation, of the body part form a presettable acceleration range, in particular a set acceleration range, in particular proportionally to the deviation, preferably based on a presettable function or a presettable characteristic. In this manner, it is allowed to give a feedback to the user, from which he can already extract how much the positional value still deviates from a set positional value. For example, if the image of the application is still very blurred or very dark within certain image areas at the current positional value, i.e. for example the current position or speed or acceleration of the body part, thus, this indicates that a considerable deviation of the positional value from the set positional value exists.

Therein, the presettable function or the presettable characteristic can progress in binary manner or continuously at least in sections and/or in steps. On the example of the already mentioned shadowing, thereby, it can be allowed that the presented image of the application is very dark as long as the user is outside of a set positional range, and then suddenly becomes bright as soon as the user is in the set positional range. In case of a continuous or step-wise progression, for example, the shadowing can be decreased continuously or in steps such that the presented image of the application increasingly brightness upon approach of the user to the set positional range and increasingly darkens or decreases or becomes more blurred or disadvantageously changes with regard to the conceivableness thereof by the user as otherwise described upon his departure from the set positional range.

Furthermore, it is preferred that the positional value determined from the at least one second image is correlated with the position and/or the orientation of the body part relative to the capturing device and/or is correlated with the speed and/or the acceleration, with which the body part is moved relative to the capturing device.

This measure in particular opens the possibility of capturing gestures and facial expressions.

As the at least one presentation parameter, preferably, a brightness value, a brightness gradient, a color, a color gradient, a magnification/reduction, a magnification progression, a resolution, a resolution progression or combinations of these presentation parameters are used. In particular in applications, in which at least two positional values are to be adjusted, for example the position of a body part of the user as well as the speed, with which this body part is moved, it is advantageous if the one positional value is adjusted by the variation of a first presentation parameter, while the other positional value is adjusted by variation of a second presentation parameter. For example, the position can be adjusted by the brightness value and the speed by the resolution.

As already mentioned, it is particularly advantageous if the at least one presentation parameter is varied in real time such that a feedback is given to the user in adjusting the positional value. In particular with presentation parameters including a gradient or a progression, as above mentioned, thereby, the adjustment of the set range of the positional value is considerably facilitated and thereby the time required for it is shortened on the one hand, the failed attempts and the danger of distraction are minimized on the other hand.

It has proven particularly advantageous if the at least one application is specified via a user interface in a method according to the invention, wherein at least one presentation parameter and/or the type of variation of the at least one presentation parameter is associated with the at least one application depending on the positional value, in particular depending on the deviation thereof from a set range. In this manner, it is possible to perform an adaptation to the respective application, in particular to configure the set ranges increasingly smaller for example with advanced users. In this manner, the presentation parameters can also be user-specific and/or application-specific adjusted, that is, the preferences or the possibilities of the user and additionally or alternatively the requirements of the application, which are optionally restricted or restricting, can be considered.

Therein, it can be specified that a presentation according to step d) is omitted upon exceeding a presettable deviation, in other words, the presentation parameter is then modified such that the image of the application is for example completely colored black. In corresponding manner, it can be provided that the body part captured in step b) is used for tracking, wherein upon loss of the tracking, the at least one presentation parameter is modified in presettable manner, in particular such that the presentation shows a presettable pattern, preferably a hatching or a uniform color, preferably such that a presentation according to step d) is omitted. For example, to this, the image of the application can be completely colored black. Alternatively, a constant presentation parameter such as for example a uniform attenuation of the presentation can also be used to signal to the user that the capturing device does not perceive him as intended.

Generally, the at least one presentation parameter can be varied such that one or more of the following presentations, in particular as 2D or 3D presentations, are adjusted if the positional value is not in the set range:

a) shadowing, in particular also complete coloring, of parts of the first image, in particular round, cornered, starting from at least one of the sides, by presentation of a window or curtain, binary or with gradients; b) corresponding to a), but with respect to the blur; c) only restricted to the application presented on the display device or related to the entire presentation on the display device.

Further advantageous embodiments are apparent from the dependent claims.

The embodiments presented with respect to the method according to the invention and the advantages thereof correspondingly apply to the system according to the invention, if applicable.

Thus, in a system according to the invention, the processing device is adapted to determine the position of the body part of the user from the at least one second image, wherein the processing device is further adapted to present the at least one first image using at least one presentation parameter, wherein the at least one value of the at least one presentation parameter depends on at least one positional value, which is correlated with the position of the at least one body part in the at least one second image captured by the capturing device. In this context, the capturing device and the display device are preferably coupled in a presettable position to each other, in particular to each other.

Figure 2:
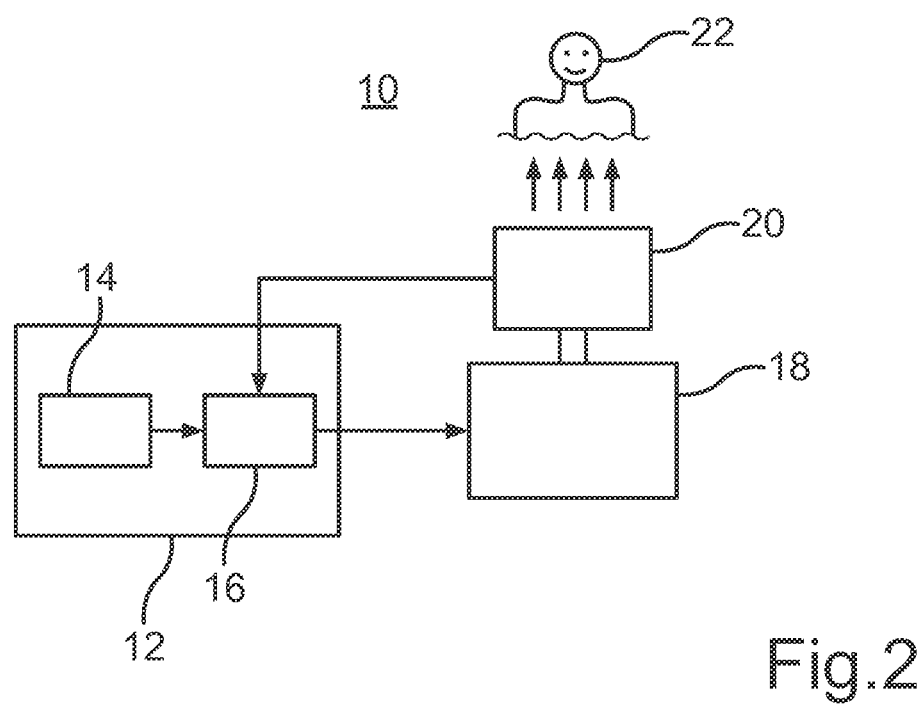
Figure 3:
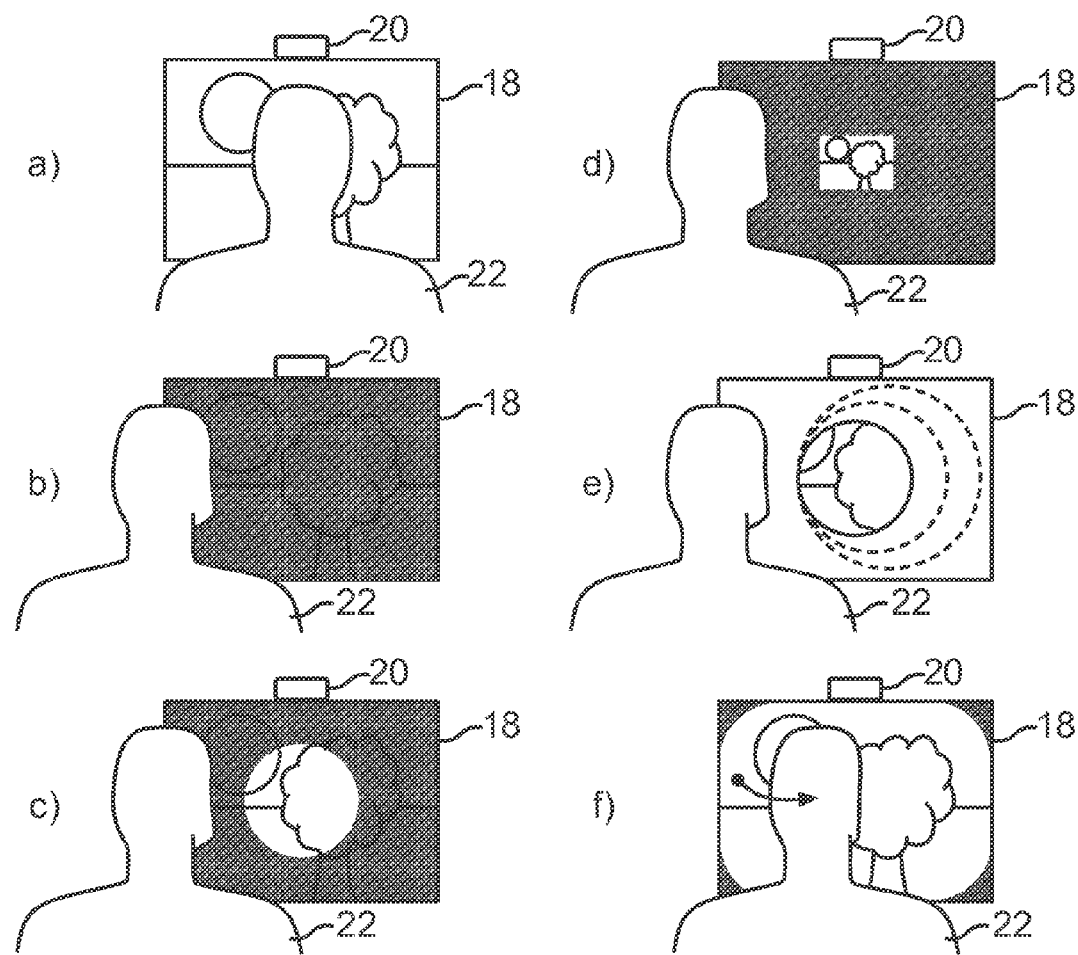
Figure 4:
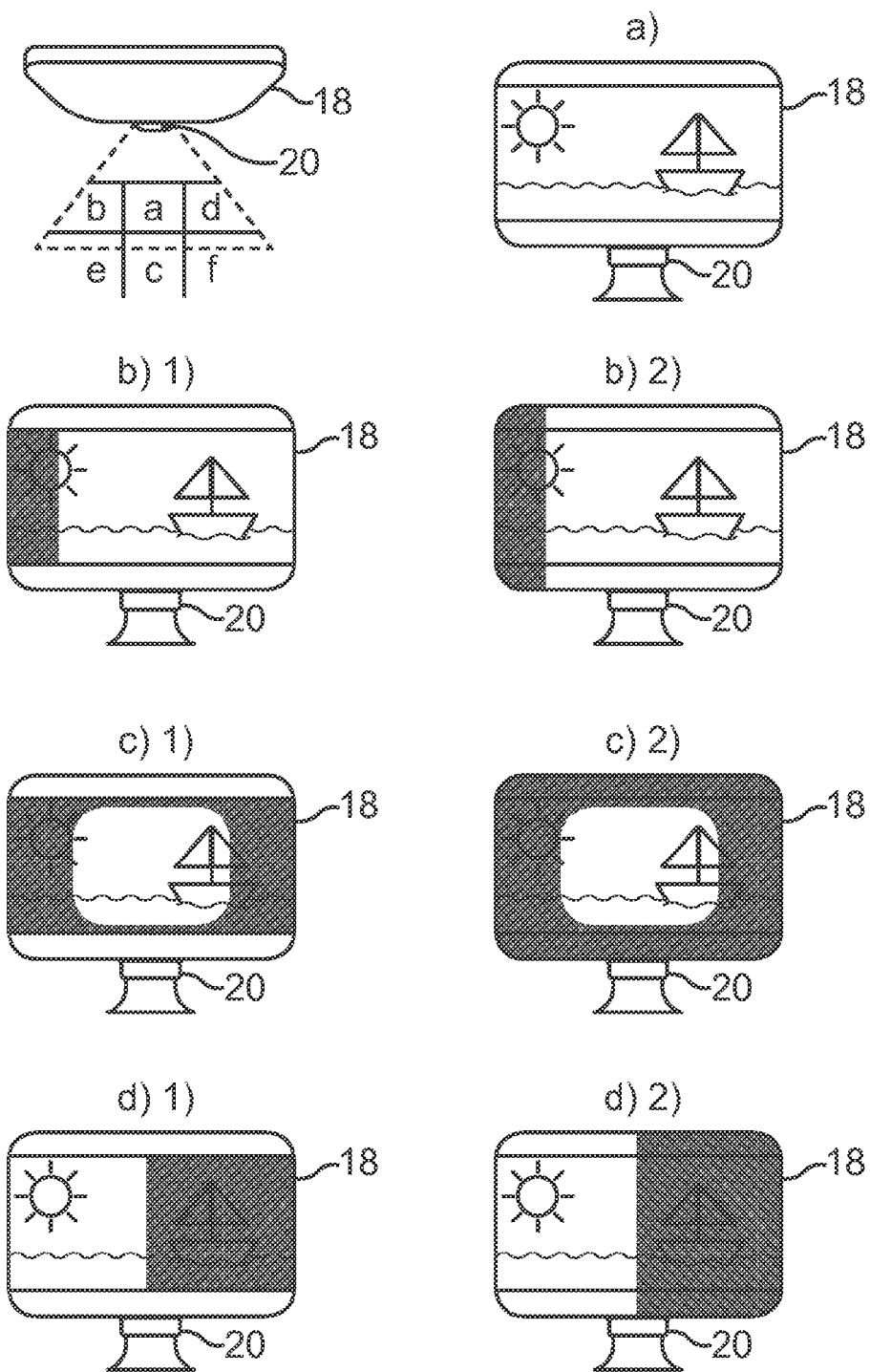

In the following, now, embodiments of the present invention are described in more detail with reference to the attached drawings. There show:

FIG. 1 in schematic illustration a flow diagram for an embodiment of a method according to the invention;

FIG. 2 in schematic illustration the construction of an embodiment of a system according to the invention;

FIG. 3 in schematic illustration the resulting presentations of the application on the display device depending on the position of the user to the capturing device for different embodiments; and FIG. 4 top left a diagram for presenting various positional ranges, which a user may assume relative to the capturing device, and the presentations of the application on the display device resulting from them for different embodiments of the present invention.

Within the scope of the following explanations, the same reference characters are used for identical and identically acting elements. They are introduced only once for clarity.

FIG. 1 shows an embodiment of a method according to the invention in schematic illustration. It starts in step 100. In step 110, the current position of a body part of a user is captured by means of a capturing device. In step 120, the captured actual position is compared to a set position, in particular a set positional range. Depending on the determined deviation, in step 130, a current presentation parameter is determined, and subsequently the image of an application is presented on the display device using the current presentation parameter in step 140. In step 150, it is checked if the application is terminated. If this is the case, the method proceeds to step 160 and is terminated. However, if this is not the case, the method returns to step 110. In this manner, it is allowed to provide a feedback to the user about his position relative to the capturing device in real time, wherein he is able to extract the feedback from the type of the presentation of the images of the application.

FIG. 2 shows in schematic illustration the construction of an embodiment of a system 10 according to the invention. It includes a computer 12, for example a desktop computer, a kiosk computer, a portable device such as for example a cellular phone or a tablet computer or the like, which includes a providing device 14 as well as a processing device 16. The providing device 14 is adapted to provide at least one first image of an application, in particular of a software program, to the processing device 16, wherein the providing device 14 is coupled to the processing device 16 for this purpose. Furthermore, the system 10 includes a display device 18, for example a monitor, coupled to the processing device 16 for presenting the at least one first image of the application on the display device 18. A capturing device 20 is presently mechanically coupled to the display device 18 and electronically coupled to the processing device 16, wherein the capturing device 20 is adapted to continuously capture images of a body part of a user 22, for example the head or the eyes thereof. The processing device 16 is adapted to determine the position of this body part from the images of the at least one body part of the user 22 provided by the capturing device 20. Furthermore, it is adapted to present the at least one image provided by the providing device 14 using at least one presentation parameter, wherein the value of this at least one presentation parameter depends on the position of the at least one body part of the user 22 in the at least one image captured by the capturing device 20, i.e. relative to the capturing device 20.

Preferably, the individual components of the system 10 are adapted to continuously capture images of the at least one body part of the user 22 such that the image of the application rendered on the display device 18 can be modified in real time. In that the presentation parameter is varied depending on the current actual position of the user 22, the user 22 obtains a feedback about his position.

FIG. 3 shows the images presented on the display device 18 depending on the position of the user 22 in schematic illustration for various embodiments of the present invention.

FIG. 3a) shows the conditions if the user 22 is within a presettable set range in front of the capturing device 20. The image of the application is clearly and obviously and brightly, that is without modification, presented on the display device 18. Accordingly, the presentation parameter is selected such that the image is presented in unimpaired manner, virtually in the original, on the display device 18. If the user 22 changes his position to the left, as assumed in the illustrations of the FIGS. 3b) to 3e), thus, the presentation parameter used for presenting the image of the application is modified with respect to the presentation parameter used in the illustration of FIG. 3, in order to give a feedback to the user 22 that he is not in the preset set range in front of the capturing device 20. In FIG. 3b), for this purpose, the entire image presented on the display device 18 is shadowed. According to FIG. 3c), however, the shadowing can also omit a circular section such that the user 22 can see a section of the image of the application within the circle true to original, that is as represented in FIG. 3a). In the illustration according to FIG. 3d), the magnification factor was modified as the presentation parameter. Since the person is too far to the left, the image of the application presented on the display device 18 was reduced. Alternatively, the image could also be presented in distorted manner. If the user 22 would sit too far to the right, the image of the application could also be presented in reduced manner. However, in order to give left/right information to the user, the image could also be presented in magnified manner such that the user is only able to recognize a part of the image of FIG. 3a) if the user is too far to the right. Alternatively, the image could be presented in horizontally distorted manner for left-right information, as if the image of the application would turn away from the user. FIG. 3e) shows a further embodiment, in which a tunnel or telescope effect results due to the non-optimum position of the user 22. Since the user 22 is too far to the left, he sees more elements of the right side of the image of the application.

As is obvious to the man skilled in the art, the modifications according to the FIGS. 3b) to 3e) can also be presented depending on the distance of the user 22 to the capturing device 20 (instead of the left/right shift) or combined with them. For example, in the embodiment illustrated in FIG. 3e), the circle diameter of the presentation can be varied depending on the distance of the user 22 to the capturing device 20 and the position of the circle section can be varied depending on his left/right position. Additionally or alternatively, the presentation can be modified behind such a masking, for example it can be presented in reduced, magnified, distorted or fuzzy, i.e. blurred, manner.

FIG. 3f) shows, how the circle section increases if he user 22 displaces his position a bit further to the right, i.e. towards the optimum position. The circle, in which the user 22 can clearly and distinctly recognize the image of the application, expands. Only if the position of the user 22 is within a presettable set range, then, the black drawn corners on the display device 18 also disappear.

FIG. 3g) shows a modification of FIG. 3b). Therein, the brightness progression changes according to a gradient. In that the user 22 is too far to the left, the image of the application is presented on the display device 18 such that it becomes increasingly darker from the right to the left. The user 22 can no longer recognize the left areas of the image and therefore will intuitively displace his position further to the right. With increasing displacement to the right, the image becomes increasingly brighter until it corresponds to the image of FIG. 3a), if the user 22 is in the set range. If the user would displace his position beyond the set range too far to the right, the image of the application presented on the display device 18 would become increasingly darker to the right. The further the user is to the right of the set range, the darker the image presented on the display device 18 would become.

FIG. 3h) shows an embodiment, in which the features of FIG. 3c) and FIG. 3g) are combined. The brightness gradient progresses in radial manner. Therein, the presented brightness can be correlated with the left/right position and the radius of the central, unmodified area can be correlated with the distance to the capturing device 20, or vice versa.

FIG. 4 shows further embodiments of the present invention, that is different presentations on the display device 18 depending on a position of the user 22 in front of a capturing device 20. Top left, four different positional ranges of a user 22 relative to a capturing device 20 coupled to a display device 18, identified with a) to d), are illustrated. A set positional range is denoted by a). If the user 22 is too far to the left, thus, he is in the range b). If he is too far to the right, he is in the range d). If the user is too far away from the capturing device 20, he is in the range c). Of course, further ranges e) and f) can be provided, in which the user 22 sits both too far at the side and too far away.

If the user 22 is in the set range a), the image of the application is presented true to original on the display device 18. If he sits too far to the left, that is in the range b), the image of the application is shadowed on the left, see FIG. 4b) 1). FIG. 4b) 2) shows a variant, in which not only the image of the application presented on the display device 18 is shadowed, but the entire display of the display device 18, that is also the corresponding background of the application, which can for example also be constituted by other applications.

FIG. 4c) 1) shows the display on the display device 18 if the user is in the positional range c), that is a partial area in the center of the application is presented in unmodified manner, while the outer areas are either uniformly blurred or shadowed or using a gradient. If the user 22 would be in the range e) or the in range f), the sharply presented area could be correspondingly displaced to the left or to the right.

FIG. 4c) 2) corresponds to the presentation of FIG. 4b) 2), that is the entire display of the display device 18 is again modified and not only the display area intended for the application.

FIG. 4d) 1) shows the modification if the user is in the display range d), that is he sits too far to the right. FIG. 4d) 2) again corresponds to the presentation of FIG. 4b) 2).

Instead of the circular or cornered modification areas selected for simplifying the presentation, the modification can also be effected in the form of a curtain, a shutter (horizontal or vertical) or the like.

In the case of the curtain, for example, the entire presentation on the display device is only released to the application, if the user is in the set positional range.

In an embodiment not illustrated, it is simulated as if the frame of the display device would have a three-dimensional extension towards the user. In other words: as if a cardboard box without bottom would be fitted onto the display device. The user looks through the cardboard box on the display device. Accordingly, if the user sits too far to the left, the left wall of the cardboard box would prevent the user from being able to recognize the left image components of the application. The corresponding applies if the user sits too far to the right. If the user is in a presettable set range, he has virtually a free view to the entire image of the application.

Although the above explanations were made with regard to a set position, of course, this correspondingly applies if the point is that the body part of the user moves with a set speed or is moved with a set acceleration.

According to a further embodiment, a dynamic gradient is applied such that if the user moves laterally to the front of the capturing device, the parts farther away are shadowed on the monitor and therefore are worse recognizable. In another embodiment, the closer parts of the presentation on the display device are presented shadowed with a gradient such that the impression arises for the user that he looks through the frame of the display device to a presentation located behind, which is shadowed by the frame of the display device, if he moves outside of the set range. Furthermore, the presentation on the display device can also be shifted as in a three-dimensional presentation such that the impression of a look into a tube or a box with display located behind arises. This impression will result in the user moving more in front of the center of the capturing device such that he is able to well see all of the areas of the presentation interesting him on the display device.

Instead of shadowing or additional to shadowing, overbrightening, reduction of the resolution, the incorporation of disturbances and the like is considered, which give feedback to the user that he is outside of the admissible set range or that he is not correctly oriented, but turned. This too is interpreted by the user to the effect that he is outside of the set range such that he is urged to again move into the set range. A corresponding visual effect can be achieved if the user looks through a tube with diffuse edges onto the display device.

As already mentioned, the presentation modifications according to the invention can be employed not only for lateral movements in relation to the capturing device, but also for rotations or for the depth distance if relevant restrictions are present in these positional relations for the application. The respective parameters can result due to the optical angle of view of the capturing device, as well as also due to limitations resulting from an optionally employed illumination with respect to range and/or light cone and/or from limitations resulting from the employed algorithms for capturing a body part in front of the capturing device.

As already mentioned, the gradient of the corresponding measures can vary from the center to the borders of the image presented in the display device. The conversion or gain factor of the corresponding measure can also be formed adjustable, in particular depending on the position of the user, depending on the application as well as the user status.

The invention claimed is:

1. Method for presenting at least one image of at least one application on a display device, including the following steps of:
   a) providing at least one first image of the application to a processing device;
   b) capturing at least one second image of at least one body part of at least one user with at least one capturing device;
   c) coupling the at least one second image to the processing device;
   d) displaying the at least one first image provided in step a) on the display device as a representation;
   wherein the displaying in step d) is effected using at least one representation parameter, wherein the at least one value of the at least one representation parameter depends on at least one positional value, which is correlated with the position of the at least one body part in the at least one second image captured in step b), wherein the at least one value of the at least one representation parameter is varied depending on a deviation of the positional value of the at least one body part from a presettable set range,
   characterized in that
   if the positional value is in a first range outside of the set range, the at least one representation parameter is varied such that part of the at least one first image represented in a first image area of the representation is represented in unmodified manner and part of the at least one first image represented in a second image area is represented in modified manner, wherein a boundary from the first to the second image area is modified by modification of the at least one representation parameter depending on the deviation of the positional value from the set range such that a size of the first image area increases as the deviation of the positional value from the set range decreases.

2. Method according to claim 1,
   characterized in that
   if the positional value is not in the set range, the at least one representation parameter is varied starting from at least one of the sides related to the application represented on the display device or related to the entire representation on the display device.

3. Method according to claim 1,
   characterized in that
   for the displaying in step d), for at least one first presettable pixel a first representation parameter and for at least one second presettable pixel a second representation parameter differing from the first representation parameter are modified in presettable manner depending on the positional value.

4. Method according to claim 1,
   characterized in that
   the at least one value of the respective representation parameter is varied in presettable manner depending on the deviation of a position of the body part from a presettable positional range, in particular a set positional range, and/or depending on the deviation of a speed, that is a positional variation, of the body part from a presettable speed range, in particular set speed range, or depending on the deviation of an acceleration, that is a positional speed variation, of the body part from a presettable acceleration range, in particular a set acceleration range, in particular proportionally to the deviation, preferably based on a presettable function or a presettable characteristic.

5. Method according to claim 4,
characterized in that
the presettable function or the presettable characteristic progresses in binary manner or continuously at least in sections and/or in steps.

6. Method according to claim 1,
characterized in that
the positional value determined from the at least one second image is correlated with the position and/or orientation of the body part relative to the capturing device and/or correlated with the speed and/or the acceleration, with which the body part is moved relative to the capturing device.

7. Method according to claim 1,
characterized in that
as the at least one representation parameter, a brightness value, a brightness gradient, a color, a color gradient, a magnification, a magnification progression, a resolution, a resolution progression or combinations thereof are used.

8. Method according to claim 1,
characterized in that
the at least one representation parameter is varied in real time such that a feedback is given to the user in adjusting a set range of the positional value.

9. Method according to claim 1,
characterized in that
the at least one application is specified via a user interface, wherein at least one representation parameter and/or the type of the variation of the at least one representation parameter is associated with the at least one application depending on the positional value, in particular depending on the deviation thereof from a set range.

10. Method according to claim 9,
characterized in that
upon exceeding a presettable deviation, the at least one representation parameter is modified such that a representation according to step d) is omitted.

11. Method according to claim 1,
characterized in that
the body part captured in step b) is used for tracking, wherein upon loss of the tracking the at least one representation parameter is modified in presettable manner, in particular such that the representation shows a presettable pattern, preferably a hatching, or a uniform color, or that a representation according to step d) is omitted.

12. Method according to claim 1,
characterized in that
the at least one representation parameter is varied such that one or more of the following representations, in particular as 2D or 3D representations, are adjusted if the positional value is not in the set range:
a) shadowing, in particular also complete coloring, of parts of the first image, in particular round, cornered, by representation of a window or curtain, binary or with gradients;
b) corresponding to a), but with respect to the blur.

13. Method according to claim 1,
characterized in that
the part of the first image represented in the second image area is represented in the modified manner with regard to at least one of brightness, resolution, color, incorporation of disturbances and distortion, and the part of the first image represented in the first image area is represented in the unmodified manner with regard to at least one of brightness, resolution, color, distortion and incorporation of disturbances.

14. System for presenting at least one image of an application, including:
a processing device;
a providing device adapted to provide at least one first image of the application to the processing device, wherein the providing device is coupled to the processing device;
a capturing device coupled to the processing device, wherein the capturing device is adapted to continuously capture second images of at least one body part of a user; as well as
a display device coupled to the processing device for displaying the at least one first image as a representation;
wherein the processing device is adapted to determine the position of the body part of the user from the at least one second image, wherein the processing device is further adapted to represent the at least one first image using at least one representation parameter, wherein the at least one value of the at least one representation parameter depends on at least one positional value depending on the position of the at least one body part in the at least one second image captured with the capturing device,
characterized in that
if the positional value is in a first range outside of the set range, the processing device is adapted to vary the at least one representation parameter such that part of the at least one first image represented in a first image area of the representation is represented in unmodified manner and part of the at least one first image represented in a second image area is represented in modified manner, wherein a boundary from the first to the second image area is modified by modification of the at least one representation parameter depending on the deviation of the positional value from the set range such that a size of the first image area increases as the deviation of the positional value from the set range decreases.

15. System according to claim 14, characterized in that the capturing device and the display device are coupled in a presettable position to each other.

* * * * *